W. F. PEREZ.
FENDER FOR AUTOMOBILES.
APPLICATION FILED MAY 15, 1911.

1,023,393.

Patented Apr. 16, 1912.

2 SHEETS—SHEET 1.

Witnesses:
S. P. Buck,
L. N. Gillis

Inventor
W. F. Perez.
By
Attorneys

W. F. PEREZ.
FENDER FOR AUTOMOBILES.
APPLICATION FILED MAY 15, 1911.

1,023,393.

Patented Apr. 16, 1912.
2 SHEETS—SHEET 2.

Witnesses
S. P. Buck.
L. N. Gillis.

Inventor
W. F. Perez.
By
Attorneys.

UNITED STATES PATENT OFFICE.

WALDO F. PEREZ, OF TAMPA, FLORIDA.

FENDER FOR AUTOMOBILES.

1,023,393.　　　　　Specification of Letters Patent.　　Patented Apr. 16, 1912.

Application filed May 15, 1911. Serial No. 627,233.

*To all whom it may concern:*

Be it known that I, WALDO F. PEREZ, a citizen of the United States, residing at Tampa, in the county of Hillsboro, State of Florida, have invented certain new and useful Improvements in Fenders for Automobiles; and I do hereby declare the following to be a full, clear, and exact description of the invention, such as will enable others skilled in the art to which it appertains to make and use the same.

This invention relates to fenders and has special reference to a form of safety fender adapted for use especially in connection with automobiles.

One object of the invention is to provide a novel construction of fender of this class which may be readily attached to any automobile and which is so arranged that any person struck by the automobile will be picked up by the fender and injury prevented by either the automobile or its wheels.

Another object of the invention is to provide a form of folding fender adapted for use with automobiles so that when running over rough roads the lower section may be folded up to prevent injury thereto, the lower section also being capable of folding to permit the automobile to be stored in less space than when the section is in operative position.

With the above and other objects in view the invention consists in general of a framework adapted to be attached to an automobile, the framework being of novel and improved form, and resilient guard sections held in various parts of said framework, in combination with a supplemental frame hinged to the main frame and carrying a guard section, and means to limit the movement of the supplemental frame in one direction.

The invention further consists in certain novel details of construction and combinations of parts hereinafter fully described, illustrated in the accompanying drawings, and specifically set forth in the claims.

Figure 1:
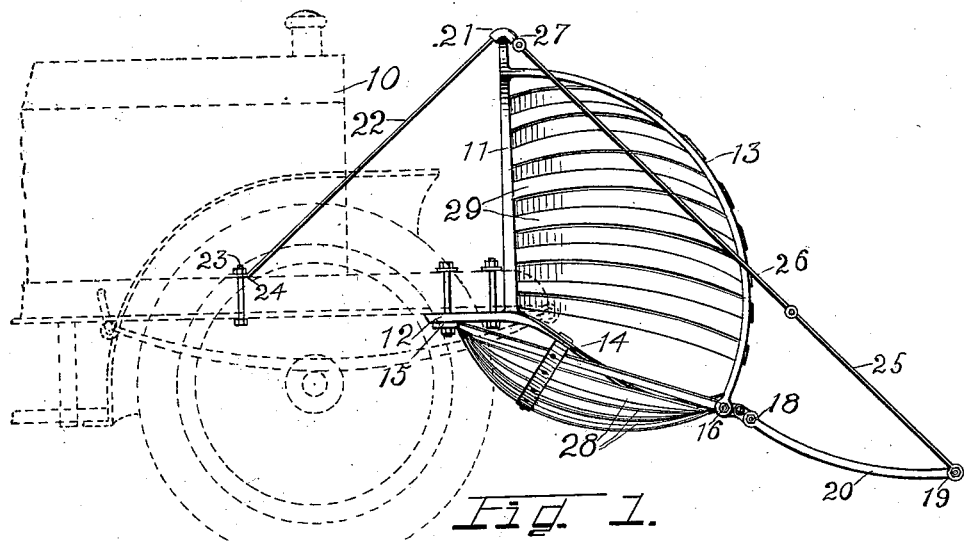
Figure 2:
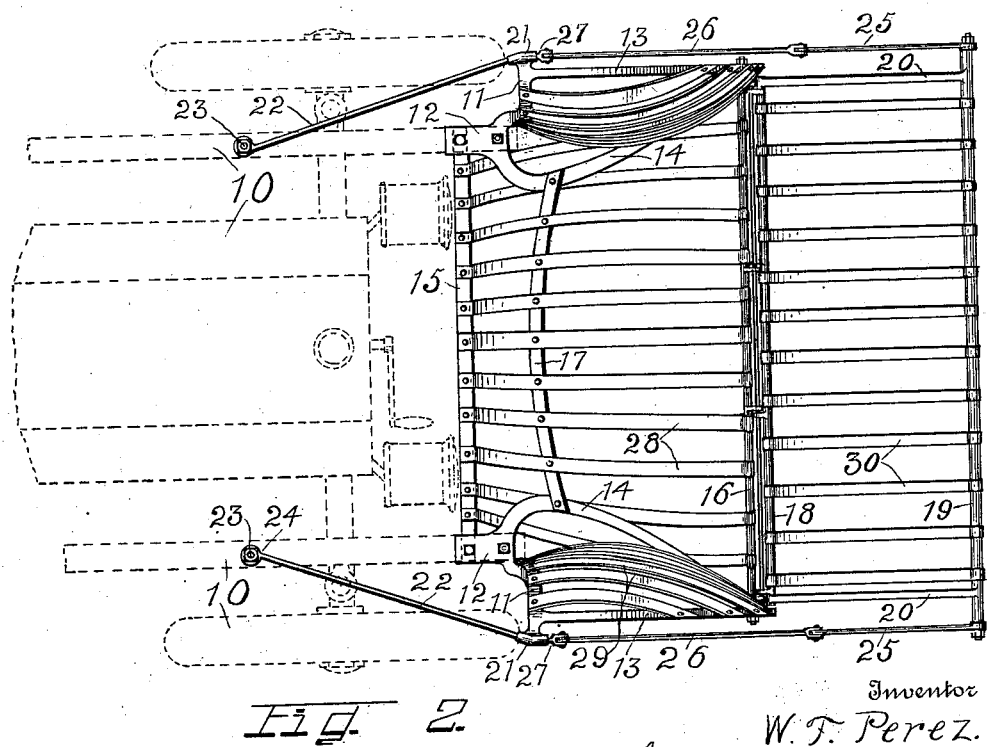
Figure 3:
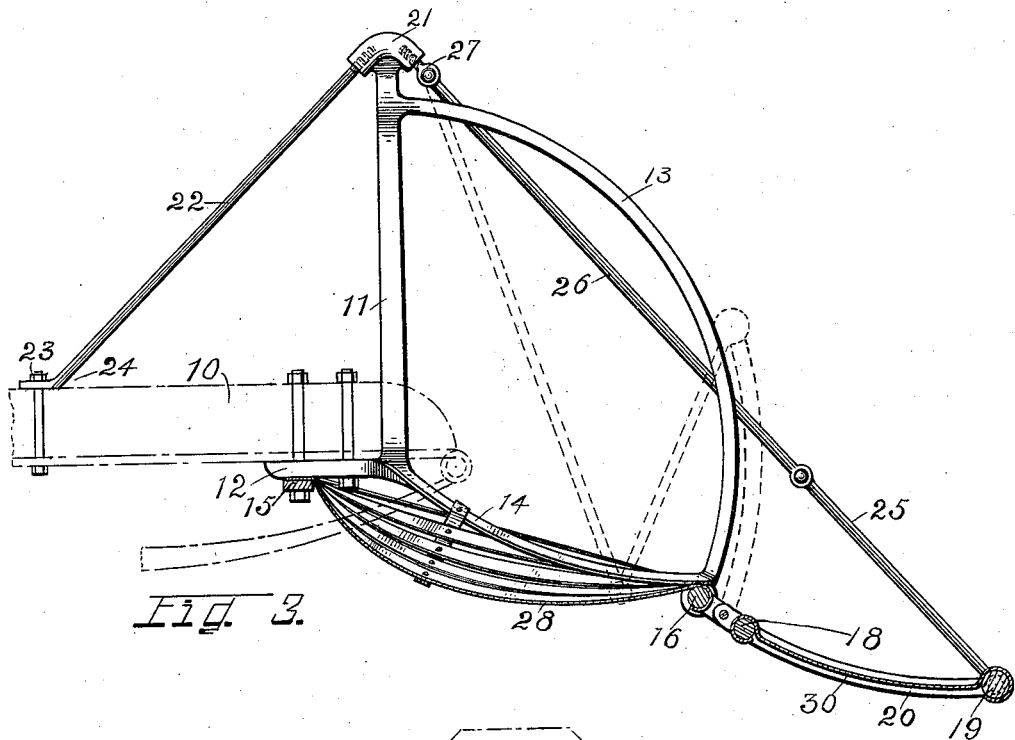
Figure 4:
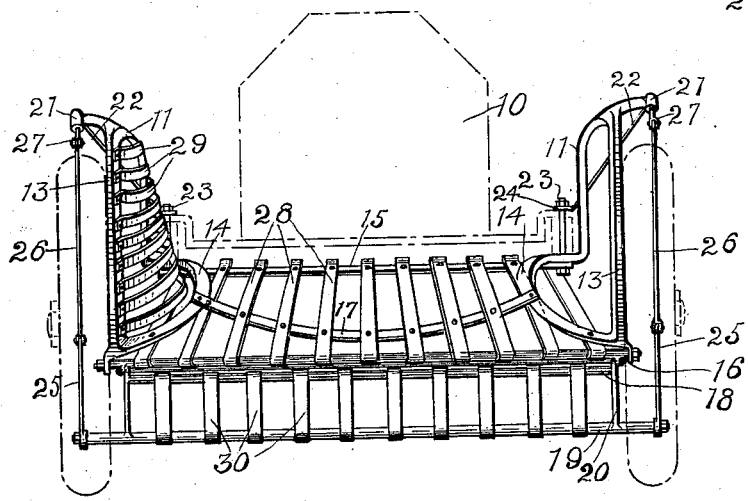

In the accompanying drawings, like characters of reference indicate like parts in the several views, and;—Figure 1 is a side elevation of the invention, an automobile front being indicated in dotted lines in order to show the relation of the invention to the machine. Fig. 2 is a plan view of the invention as shown in Fig. 1. Fig. 3 is a section on the line 3—3 of Fig. 2, the section being slightly enlarged. Fig. 4 is a front view of the device as disclosed in Figs. 1 and 2.

The numeral 10 indicates a portion of an automobile.

The frame of the invention comprises a pair of upstanding corner members 11 each of which is provided with a foot 12 to enable the same to be attached to an automobile. Extending forwardly from a point adjacent the upper end of each of these members is an arcuate side member 13 and from the bottom of each of the members 11 extends an arcuate bottom side member 14, this member extending forwardly and downwardly.

The feet 12 are connected by a cross bar 15 and the members 14 and 13 are united at their forward ends and connected by means of a cross bar 16 while intermediate the ends of the members 14 there is provided one or more brace bars 17. Hingedly connected to the bar 16 is a supplemental frame comprising a rear transverse member 18, a forward transverse member 19 and side members 20. At the upper end of each of the members 11 is fixedly secured a cap member 21 of inverted V-shape and to the rear leg of the V is threaded a brace rod 22 capable of being attached to the automobile frame by means of a bolt 23 passing through a foot 24 formed on said brace rod. Pivotally connected to each end of the bar 19 is a brace rod section 25 and connected to each of these sections is a second brace rod section 26, the connections being likewise pivotal. Carried by the forward leg of each of the V members 21 is an eye 27 whereto the upper end of the brace rod section 26 is pivoted, the sections thus forming a folding brace rod similar to those commonly used in buggy tops. Between the cross bar 15 and the cross bar 16 extends a series of resilient members 28 forming a downwardly dished main bottom section carried by the frame. Between the members 11 and 13 on each side are other resilient bars 29 which guard the wheels of the automobile and are inwardly dished to form resilient side guards carried by the frame and extending over said wheels. Between the rods 18 and 19 are further resilient members 30 which form a resilient supplemental downwardly dished bottom.

The device thus formed can be readily applied to any automobile and will be in such position as to protect anyone in the path of the automobile from being run over or struck by the wheels, while by bending the rod sections 25 and 26 at their joint the front portion of the fender may be folded as indicated in dotted lines in Fig. 3. There is thus provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a fender of the kind described, a main frame adapted for attachment to an automobile, a resilient main bottom section carried by said frame, resilient side guards adapted to extend in advance of the wheels of the automobile and carried by the frame, a supplemental frame hinged to the front of the bottom of the main frame, hinged rods connecting the upper part of the main frame with the free edge of the supplemental frame, a resilient bottom in said supplemental frame, and brace rods extending rearwardly from the top of the main frame and having their free ends adapted for attachment to the automobile.

2. In a fender of the kind described, a main frame adapted for attachment to an automobile, a resilient downwardly dished main bottom section carried by said frame, resilient inwardly dished side guards adapted to extend in advance of the wheels of the automobile and carried by the frame, a supplemental frame hinged to the front of the bottom of the main frame, hinged rods connecting the upper part of the main frame with the free edge of the supplemental frame, a resilient downwardly dished bottom guard in said supplemental frame, and brace rods extending rearwardly from the top of the main frame and having their free ends adapted for attachment to the automobile.

In testimony whereof, I affix my signature, in presence of two witnesses.

WALDO F. PEREZ.

Witnesses:
W. W. WARD,
V. E. HIGGS.

---

Copies of this patent may be obtained for five cents each, by addressing the "Commissioner of Patents, Washington, D. C."